United States Patent
Rush

[15] 3,707,115
[45] Dec. 26, 1972

[54] METHOD FOR PRODUCING A THREE-DIMENSIONAL DIORAMA

[72] Inventor: Richard B. Rush, 170 Grandview, Glen Ellyn, Ill. 60137

[22] Filed: Feb. 18, 1971

[21] Appl. No.: 116,474

[52] U.S. Cl. .......................95/12, 40/130 B, 353/28, 353/121
[51] Int. Cl. ...........................................G03b 29/00
[58] Field of Search ..........95/12, 82, 83, 85; 353/28, 353/74, 77, 78, 121; 156/58, 59; 40/130 B; 272/10; 352/48, 85, 88

[56] References Cited

UNITED STATES PATENTS

| | | | |
|---|---|---|---|
| 3,090,280 | 5/1963 | Winter, Jr. .......................40/130 B X |
| 3,391,601 | 7/1968 | Santandra et al...................353/28 X |
| 3,040,622 | 6/1962 | Reddle et al. ..........................353/78 |
| 2,281,033 | 4/1942 | Garity..............................353/121 X |

Primary Examiner—Robert P. Greiner
Attorney—James F. Coffee

[57] ABSTRACT

A changeable exhibitor utilizing a three-dimensional reflective screen surface upon which is projected a series of photographic transparencies, each illustrating the same basic exhibit in full color but differing in details. The method employed in achieving the changeable exhibit includes utilizing the three-dimensional screen as the base for a number of full color, three-dimensional models, each differing in detail, wherein each model is photographed from an indexed position. After all of the desired models are photographed, the base is stripped of all removable details and the three-dimensional reflective surface becomes a screen upon which the photographic transparencies are projected in sequence to illustrate changes in full color of the same basic form or model.

2 Claims, 13 Drawing Figures

PATENTED DEC 26 1972 3,707,115

INVENTOR
RICHARD B. RUSH

BY James D. Coffee
ATTORNEY

INVENTOR
RICHARD B. RUSH

INVENTOR
RICHARD B. RUSH

BY James D. Coffee
ATTORNEY

METHOD FOR PRODUCING A THREE-DIMENSIONAL DIORAMA

BACKGROUND OF THE INVENTION

The present invention relates generally to dioramas and is particularly directed to a novel form of diorama and a method for producing the novel three-dimensional diorama.

Various techniques have been employed heretofore in producing dioramas (scenic illustrations with diminishing perspective) for use in museums, schools, and various other training programs and public exhibits. The more sophisticated dioramas have used a three-dimensional landscape including figures, buildings etc. in conjunction with lighting effects and sound, but such exhibits have been quite static in that the scene is constant in appearance except for the lighting effects. In order to provide the illusion of changes in known forms of dioramas, multiple models are provided which are mounted for movement relative to the viewing area. The latter form of diorama installations are not only costly to produce but also require frequent maintenance and occupy considerable space.

SUMMARY OF THE INVENTION

The present invention provides a novel form of diorama which adds the dimension of time to a particular scene, i.e. shows changes in the physical composition of a scene or exhibit, without requiring movement of the scenic model or other exhibit and with the use of a single three-dimensional model during the exhibiting of such model in an unlimited number of stages of development. Generally, this is achieved by a novel method including preparing the basic form of the three-dimensional exhibit (e.g., a three-dimensional topographical reproduction of a land form) of material capable of providing a reflective screen surface for projection of a film transparency thereon, and then adding three-dimensional details in full color to such surface to provide the initial scene to be viewed. This scene (Scene One) is photographed and the base form is then stripped of at least some of its details which are then replaced by new three-dimensional details to provide a change in the scene and produce "Scene Two." This procedure may be continued on through as many different changes in the basic scenery as desired. By accurately registering the camera position relative to the basic three-dimensional screen surface each time a photograph is taken, and by similarly registering the projector relative to such surface, any number of photographic transparencies can be projected in sequence on the three-dimensional screen to illustrate changes in the photographed area while providing a three-dimensional full color diorama.

Figure 1:
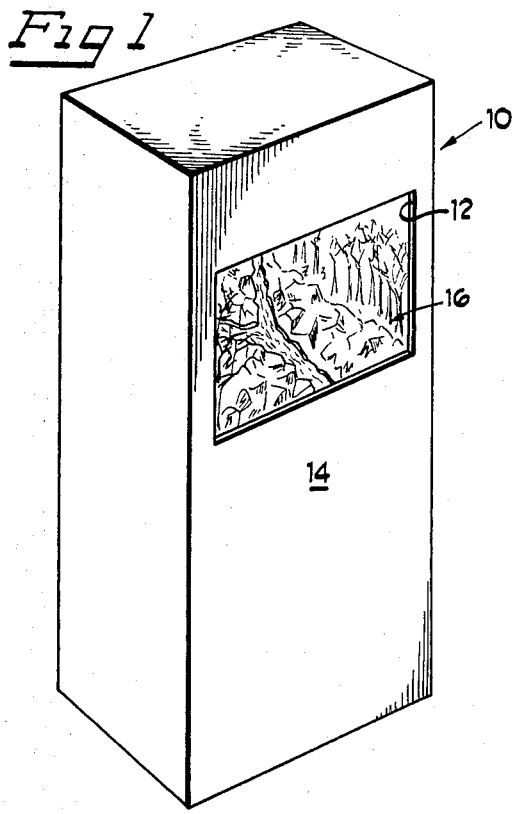
FIG. 1 is a perspective view of a diorama exhibitor embodying the present invention.
Figure 4:
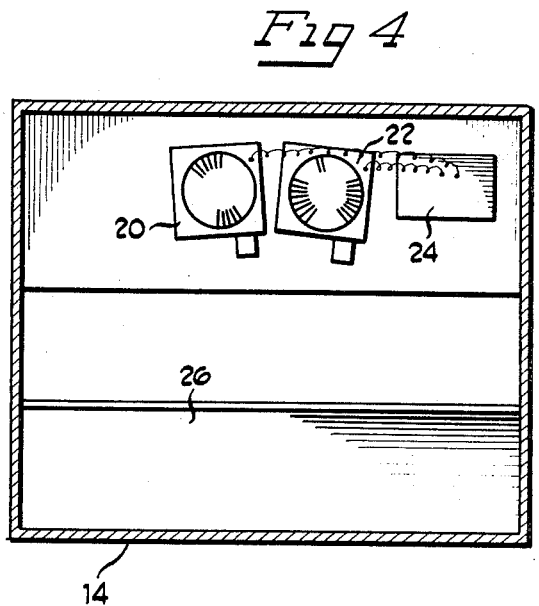
FIG. 4 is a top plan view of the diorama apparatus, with the top wall removed.
Figure 3:
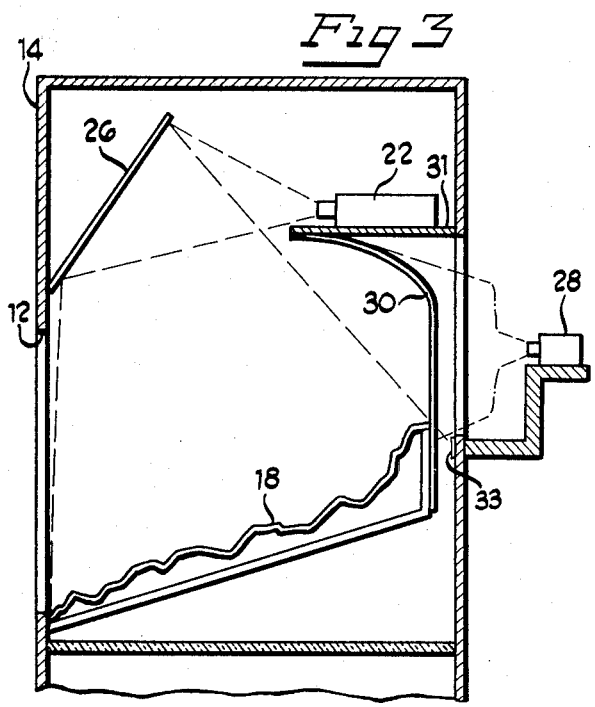
FIG. 3 is a sectional view taken along the line 3—3 in FIG. 2.
Figure 2:
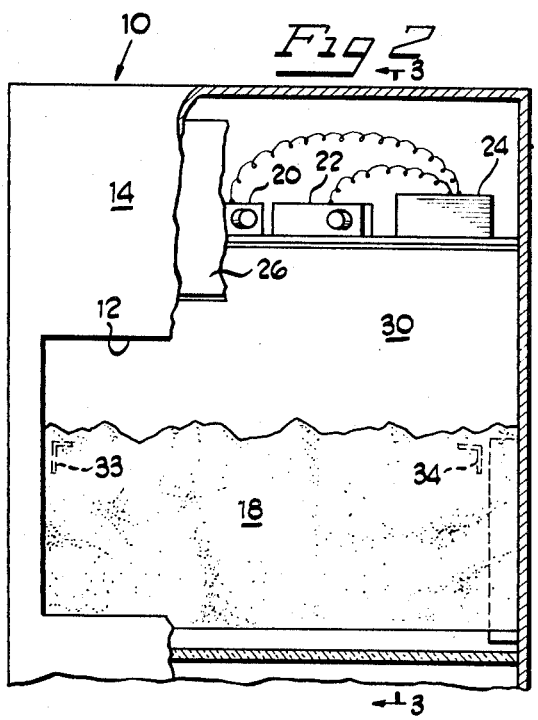
FIG. 2 is an enlarged front elevational view of the diorama exhibitor in FIG. 1, with parts broken away to illustrate the projector installation.

With reference to the accompanying drawings, it will be seen that the invention includes a method for preparing a novel form of diorama presentation, as well as novel apparatus for presenting a changing diorama or scene on a three-dimensional plain background surface. Although the illustrated embodiment discloses a changing scenic illustration, it will be understood that the process and apparatus described herein is also applicable to other uses wherein a basic form of three-dimensional exhibit is sequentially depicted in various stages of change. For example, a three-dimensional model of a portion of the human anatomy could be used to illustrate the various steps taken in the surgical treatment of such portion of the body and the sequential changes in the appearance of such body portion.

As seen particularly in FIGS. 1-9d, the preferred embodiment of apparatus employing the present invention includes an enclosure 10 of any desired size having an opening 12 in the front wall 14 thereof for viewing the diorama 16. The diorama viewed through the opening 12 in the enclosure is in full color and is three-dimensional, with the three-dimensional aspect being in part an illusion created by the use of a three-dimensional reflective screen surface 18 (FIG. 8) having the basic configuration (e.g., togography) of the diorama subject matter. Photographic transparencies are projected in sequence on the three-dimensional screen surface 18 to exhibit changes in details of the scenic representation or other exhibit, without actually requiring the use of a multiplicity of detailed models in the exhibition.

In the illustrated embodiment, the subject matter is a landscape and the basic topography of the scenic area is built into the reflective screen surface 18 and remains the same throughout the projection of the photographs onto the surface. The projection of the photographs on the screen's surface is preferably done with a pair of projectors 20, 22 (FIGS. 2-4), including conventional "dissolve" mechanism 24, which are installed above and to the rear of the reflective screen, and an inclined mirror 26 is used in the projection of the transparencies on to the screen 18. The projectors are alternately operated to provide the sequential changing of the scene on the screen. A changing background in the nature of photographs of the sky is achieved through the use of a third projector 28 which is adapted to project photographic transparencies of the sky through a translucent screen 30 positioned above the three-dimensional screen surface 18.

Figure 8:
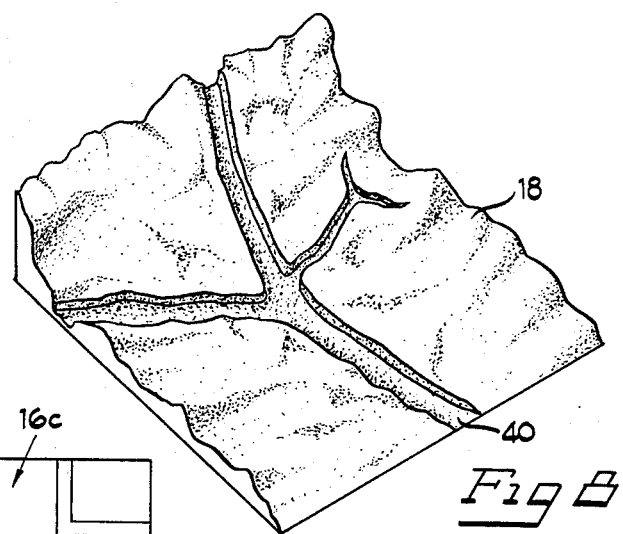
FIG. 8 is a plan view of the blank three-dimensional reflective screen surface providing the basic topography of the various scenes illustrated in the preceding figures.
Figure 9D:
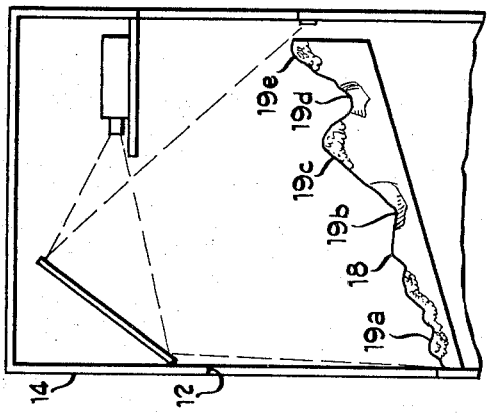
FIGS. 9a, 9b, 9c and 9d are schematic illustrations of the steps taken in producing and projecting a photographic transparency in accordance with this invention.
Figure 9C:
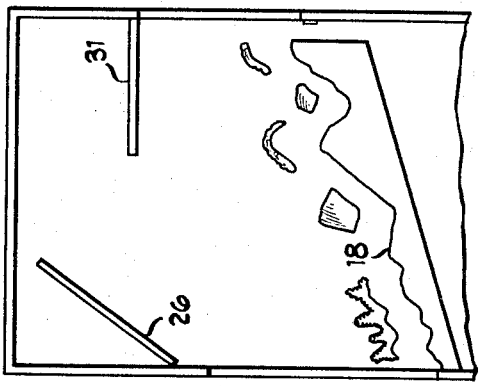
Figure 9B:
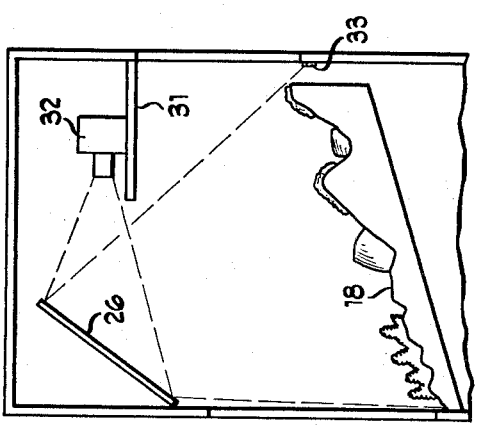
Figure 9A:
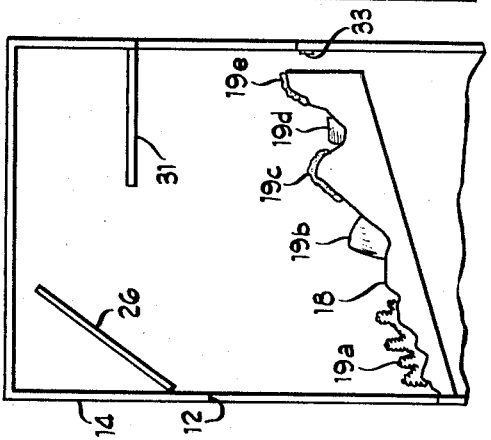

In the preparation of the diorama or exhibit, as shown schematically in FIG. 9a, 9b, 9c and 9d, there is initially prepared a three-dimensional surface 18 which is contoured to correspond with the contour of the land or other object being exhibited. This surface is made of any suitable material which is sufficiently light reflective to provide a screen on which the film transparencies can be projected. A suitable material for this use is a matte translucent white plastic. The initial scene is then prepared with the addition of full three-dimensional details and full color on the upper surface of the screen 18, as indicated in FIG. 9a, by the addition of trees, rocks etc., indicated at 19a–19e. The reflective screen surface including the first scene is then placed in the enclosure 10 and photographed (FIG. 9b) from a position on the ledge 31, which position is identical with the position of the projector to be used, using the mirror 26 as the target for the camera 32. During the taking of the photographic transparencies the camera is securely fixed in a single position, and the area of view of the camera lens is indexed with respect to the screen's surface by suitable markings on or adjacent to the screen's surface, such as the black angular markings or ribs 33, 34 seen in FIGS. 2 and 3. Thus, when the transparency is developed the index markings, indicated as 33a and 34a in FIG. 6 will appear on the two corners of the film 36 and such index markings will be accurately indexed in the corners of a transparency mounting 38 to insure registry of the projected transparency with the three-dimensional details on the reflective screen surface 18. That is, the contour defining a river bed 40 (FIG. 8) on the plain white reflective screen surface 18 will coincide precisely with the photographic reproduction of such river, etc.

After the first scene has thus been photographed and properly registered in its mounting for exhibition by the fixed projector on the exact same position each and every time on the screen 18, the screen surface is cleared of any three-dimensional sculpture details which are to be replaced by other details to be shown in the subsequent scene, as indicated in FIG. 9c. After the screen 18 has been stripped of its three-dimensional details in full color, the scene can be reproduced at any time by a projector (20, 22) placed in the position previously held by camera 32, as seen in FIG. 9d wherein details 19a–19d are photographically reproduced on screen 18.

Figure 5:
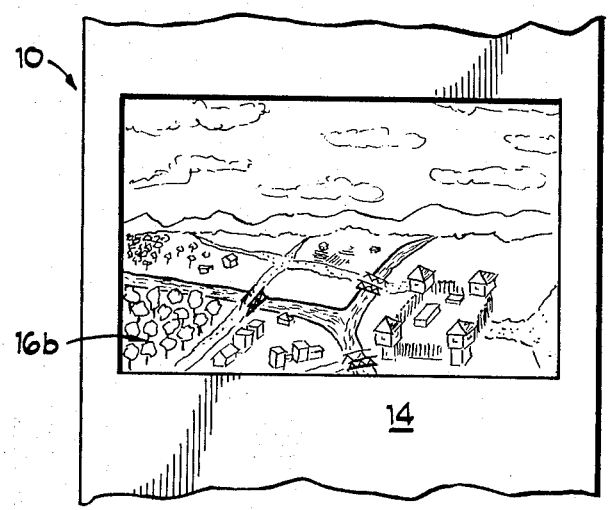
FIG. 5 is a fragmentary front elevational view of the apparatus, with the projected slide illustrating changes in the scenery over that shown in FIG. 1.
Figure 6:
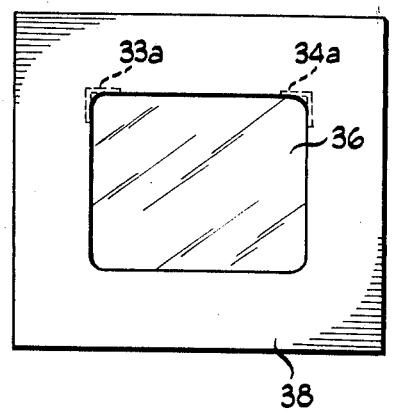
FIG. 6 is a front view of a film transparency used in the invention.
Figure 7:
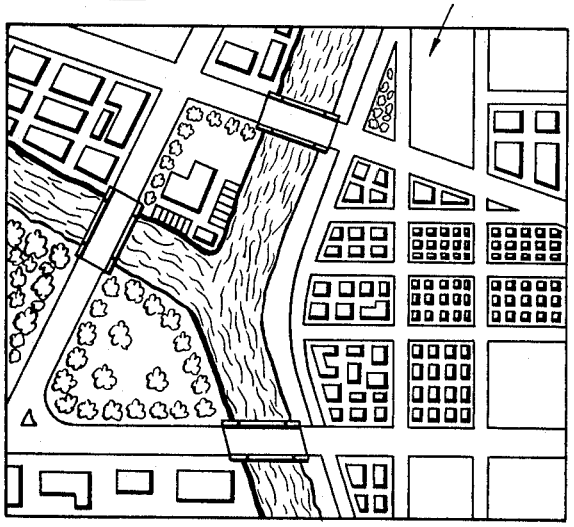
FIG. 7 is a plan view of the three-dimensional screen portion of the diorama structure, illustrating the projection of still another photograph thereon.

The new sculptured details of "Scene Two" are then placed on the screen's surface 18 to illustrate a change, such as might occur with the passage of time and include new buildings, bridges, etc. "Scene Two" is then placed in the enclosure 10 in its indexed position relative to the enclosure, the camera 32 is fixed in its position of index on shelf 31 and photographs are taken of "Scene Two." When this photograph has been properly indexed in its slide mounting 38 and checked by using it in the appropriate one of the projectors 20, 22 fixed at its indexed position in the enclosure 10, all or a portion of the sculptured three-dimensional details of "Scene Two" are removed in preparation for building the next scene. It will be apparent that as long as the same basic topographical area or other three-dimensional form is photographed an infinite number of pictures of changing scenes can be taken and projected. A typical change in scenery is illustrated in FIGS. 1, 5 and 7. FIG. 1 shows a diorama 16 of a section of topography or landscape in a natural, uninhabited form. FIG. 5 shows the same section of land with a fort, a few houses, roads and bridges to provide a changed diorama 16b, while FIG. 7 illustrated a modern settlement 16c of houses and highways in the identical position seen in FIGS. 1 and 5.

When all of the required scenes have been photographed, the reflective screen surface 18 is cleared of all sculptures in color so as to present a plain translucent and reflective screen surface, as indicated in FIG. 8. The photographs can then be projected in sequence, preferably with a dissolve mechanism 24, and a very illusory change of scenery on the three-dimensional reflective screen surface is achieved simply through the sequential projection of the photographic transparencies onto the screen.

Although a single projector may be used, the illustrated embodiment of FIGS. 1–9 incorporates two projectors 20, 22 in order to thereby achieve a smoother sequential showing of the changing scenes. Succeeding scenes are projected through alternate use of the two projectors, with the use of conventional dissolve control means indicated at 24 which is electrically connected with each of the projectors 20, 22. Through such an arrangement the photographs must, of course, be taken from the indexed position of the particular one of the projectors 20, 22 which is to be used in projecting a particular transparency.

The use of a translucent screen surface is not essential, but it does enable the additional use of lighting effects (not shown) from a position beneath the screen's surface. For example, if the scene is a battlefield the illusion of bursting shells on the ground can be provided through the flashing of colored lights below the translucent screen surface 18.

Figure 10:
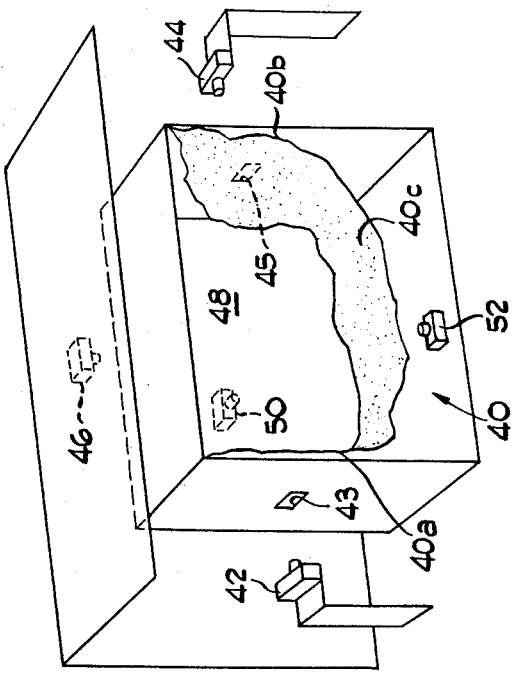
FIG. 10 is a front perspective view of a further embodiment of the invention, showing the use of multiple surfaces in the projection of a diorama.

It will be readily understood that the present invention encompasses embodiments other than that specifically described above. For example, FIG. 10 illustrated the use of the invention with a three-dimensional screen surface 40 which includes generally vertical side surfaces 40a, 40b forming essentially a continuation of the horizontal or floor surface 40c of the diorama screen 40. In this type of arrangement, a sequence of pictures are taken of changing details on each of the surfaces 40a, 40b, and 40c, and the resulting transparencies are projected simultaneously by projectors 42, 44 and 46 to provide a composite full color diorama on the screen 40. Openings 43, 45 in the side walls of the screen 40 are of a size to permit projection of the transparencies therethrough by projectors 42, 44, and the three dimensional configuration of side walls 40a and 40b can be made to conceal these openings. As in the previous embodiment, the photographs are taken of a specific area of the screen 40 and are indexed in the mount and projected from the same position occupied by the camera at the time the photographs are taken. Furthermore, the rear wall 48 of the diorama may be translucent to receive the projection of additional details by a projector 50, as in the principal embodiment, and another projector 52 beneath the translucent bottom surface 40c can be used to provide various lighting effects on the floor of the diorama.

It will also be understood that the method disclosed herein can be utilized in conjunction with motion pictures projected on a contoured form, so as to provide animation for an otherwise static exhibit. The method would be essentially the same as that described above, except that the pictures of the changes in detail of the exhibit would be recorded in sequence on movie film so as to provide a continuous change on the exhibit surface as the film is projected.

It is seen, therefore, that there is provided herein a novel method for preparing a changeable exhibit or diorama, which results in the provision of a rather simple exhibiting apparatus involving the projection of film transparencies on a three-dimensional reflective surface. There is eliminated the need for multiple landscape models and provision for their placement, as well as motorized mechanism for moving such models into view as was done heretofore.

What is claimed is:

1. A method of providing a changeable exhibit on a basic three-dimensional form, comprising the steps of (1) forming the three-dimensional form of material providing a light reflective surface, (2) erecting three-dimensional sculptural details on said surface, (3) photographing the detailed surface with the use of transparency film, (4) removing at least some of said sculptural details from said surface, (5) erecting additional sculptural details on said surface, (6) photographing the newly detailed surface with transparency film, (7) stripping said three-dimensional surface of the sculptural details previously added thereto so as to expose the light reflective surface of said three-dimensional form, and (8) projecting said film transparencies on said three-dimensional surface to thereby reproduce the sculpture previously appearing on said surface.

2. A method as set forth in claim 1, including the steps of developing said transparency film and registering the projected image of each film transparancy on said three-dimensional surface each time an image is projected.

* * * * *